United States Patent [19]
Eyb

[11] 3,758,772
[45] Sept. 11, 1973

[54] HEADLIGHT FOR VEHICLES, ESPECIALLY MOTOR VEHICLES

[75] Inventor: Wolfgang Eyb, Leonberg, Germany

[73] Assignee: Firma Dr. Ing. h.e.F. Porsche KG, Stuttgart-Zuffenhausen, Germany

[22] Filed: Dec. 29, 1970

[21] Appl. No.: 102,373

[30] Foreign Application Priority Data
Jan. 13, 1970  Germany.................. P 20 01 227.5

[52] U.S. Cl............................... 240/7.1 H, 240/8.1
[51] Int. Cl.............................................. B60q 1/06
[58] Field of Search.......................... 240/7.1 H, 8.1; 74/527, 512

[56] References Cited
UNITED STATES PATENTS
2,119,892  6/1938  Snow ............................... 240/7.1 H
2,304,356  12/1942  Heller .................................. 74/527
1,469,258  10/1923  Geistert .............................. 74/512

FOREIGN PATENTS OR APPLICATIONS
513,880  10/1939  Great Britain .................. 240/7.1 H Primary Examiner—S. Clement Swisher
Attorney—Craig, Antonelli, Stewart & Hill

[57] ABSTRACT

A headlight for vehicles, especially motor vehicles, which is pivotally mounted at the vehicle superstructure and includes an operating device, which is preferably operable from the passenger space, for pivoting the headlight into the operating position or the concealed rest position. The operating device includes an operating arm which is operable through unilateral movements and is held in its end position against the effect of a spring element and by means of a locking mechanism.

8 Claims, 2 Drawing Figures

PATENTED SEP 11 1973

3,758,772

Inventor:

WOLFGANG EYB

BY Craig, Antonelli, Stewart + Hill
ATTORNEYS

HEADLIGHT FOR VEHICLES, ESPECIALLY MOTOR VEHICLES

BACKGROUND OF THE INVENTION

The present invention relates to a headlight for vehicles, especially motor vehicles, and more particularly, to a headlight which is swingably or pivotally arranged at the vehicle body and includes an operating device, preferably operable from the passenger compartment, through which the headlight is pivoted between an in-use or operating position and a concealed rest position.

In a known pivotable headlight such as shown, for example, in U.S. Pat. No. 3,266,266, the operating device is formed by a connecting rod and a bearing bushing cooperating telescopically. The connecting rod is provided with a handle and recesses which are engaged by a stop element associated with the bearing bushing for holding the headlight in its reserved end position. The disadvantage of this arrangement, however, resides in that the stop element can become loose through vibrations during driving on uneven or rough roads, so that the headlight might unintentionally be pivoted from its open position into the concealed rest position. During night driving, this unintentional pivoting would result in a high danger of an accident. Further, good accessibility to the handle requires that it be arranged in close proximity to the dashboard, thereby making it extremely difficult to provide a protected and undisturbing arrangement of the operating device. Additionally, the rigid connecting rod for the headlight disadvantageously impairs a free construction of the motor vehicle nose framework.

SUMMARY OF THE INVENTION

It is an aim of the present invention to overcome the problems and disadvantages in the prior art arrangements in the provision of an operating device for a pivotable headlight.

It is also an object of the present invention to provide an effective and operatively reliable operating device for a pivotable headlight while, at the same time, accommodating the operating device so as not to be a disturbing structural element.

The foregoing problems and disadvantages have been solved in accordance with the present invention by providing an operating device having an operating arm which is operable through movements in the same direction and is held in its end position against the effect of a spring element as well as by means of a locking element. In this connection, it is also advantageous when, during adjustment of the operating arm, the locking mechanism will automatically disengage. It is also of further advantage to provide that the locking mechanism includes a lock pawl which is provided with a receiving section or cut-out which cooperates with a pin on the operating arm. The lock pawl is preferably pivotally or swingably supported and operatively cooperates with a spring element.

According to a further feature of the present invention, the lock pawl includes a slot or recess which make possible the disengagement of the pin on the operating arm. Advantageously, the operating arm is constructed as a foot lever, and it is additionally advantageous to provide a rope or cable at the operating arm for operating the headlight.

The advantages of the present invention reside essentially in that a simple and operatively reliable operating device is provided through a favorable construction of the operating arm and the locking mechanism. The operating arm is operable through unidirectional movements, so that the person operating the headlight for opening and closing needs only to move the operating arm in one direction, thereby providing a good operating comfort of the operating device.

Through adjustment of the operating arm, the locking mechanism automatically disengages and makes an easy and quick operation of the operating device possible. The lock pawl of the locking mechanism and the pin of the operating device provide a simple and reliable connection of these elements. The pivotable support of the lock pawl and its operative cooperation with the spring element brings about an effective engagement of the pin in the receiving section. Through the recess of the lock pawl by means of a small adjustment of the operating arm, a simple disengagment of the pin from the lock pawl is made possible.

The operating arm in accordance with the present invention is constructed as a foot lever so that it may be arranged as an unobtrusive or not disturbing structural element adjacent the foot lever mechanism for the operation of the motor vehicle so as to create an accident-proof arrangement of the operating device. By means of the rope or cable which is arranged at the operating arm and through which the headlight is operated, a free design of the nose framework of the vehicle is very possible.

BRIEF DESCRIPTION OF THE DRAWING

These and further aims, features and advantages of the present invention will become more apparent from the following description when taken in conjunction with the accompanying drawing which shows, for purposes of illustration only, an embodiment in accordance with the present invention and wherein.

DETAILED DESCRIPTION OF THE DRAWING

Figure 1:
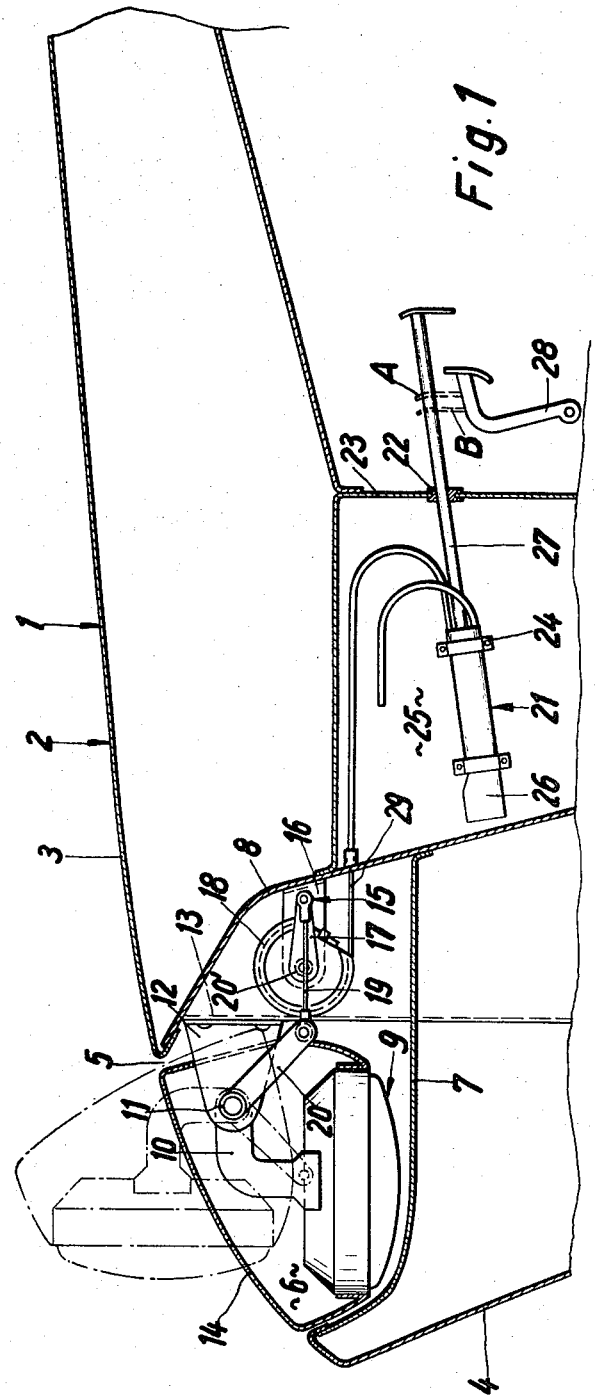
FIG. 1 is a central longitudinal cross-sectional view of a nose portion of a motor vehicle including an operating device in accordance with the present invention.

Referring now to the drawing and, in particular, to FIG. 1, the portion of the motor vehicle 1 shown includes a body 2 which is defined by walls 3, 4. An opening 5 is provided in the wall 3, through which opening a space 6 is accessible. The space 6 is defined by partition walls 7, 8 and serves to accommodate the housing of a headlight 9 which may be swung or pivoted from an in-use or operating position shown in dot-dash lines into a concealed rest position. For this purpose, the headlight 9 is held by means of brackets 10 on bearing shaft 11 which extends transverse to the vehicle longitudinal axis. The bearing shaft 11 is pivoted or rotatable at the abutments 12 which are fastened at a wall section 13 of the partition 8. The headlight is further provided with a cover 14 which covers the opening 5 of the space 6 in the concealed rest position of the headlight and matches the shape of wall 3.

A crank gear 15 is provided for operating the headlight 9. The crank gear is arranged on a console 16 positioned at the partition 8 and includes a crank 17, a rope or cable disk 18 and a connection rod 19 operatively cooperating with a lever 20 associated with the bearing shaft 11. A spring 20' (schematically illustrated) cooperates together with the crank gear 15 and is arranged on a bearing of the crank 17 while supporting itself on it and at the brackets 16. After release of an operating device 21, the headlight 9 is swung or pivoted from its operating or in-use position into the concealed rest position by the spring element 20' in a manner similar to that disclosed in U.S. Patent Application Ser. No. 101,973, filed Dec. 28, 1970, now abandoned.

The operating device 21 is fastened to a side wall 25 by holding members 24 and at a partition 23 by means of a bearing part 22. The operating device includes a housing 26 and an operating arm 27 which is constructed as a foot lever positioned in the vicinity of a pedal mechanism 28 serving for the operation of the motor vehicle. A rope or cable 29, conventional per se, is connected with the operating arm 27 at one end and surrounds the disk 18 at the other end for making possible the operation of the crank gear 15.

Figure 2:
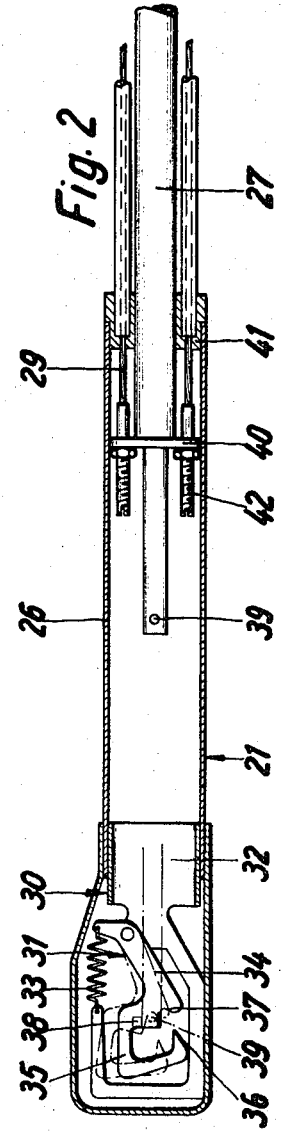
FIG. 2 is a cross-sectional view of the operating device of FIG. 1 on an enlarged scale.

As seen in FIG. 2, the operating device 21 further includes a locking mechanism 30 which holds the operating arm in an end position against the effect of the spring element arranged at the crank gear 15. The locking mechanism 30 is constructed so as to automatically release itself from this end position by adjustment of the operating arm 27, whereby the operating arm moves into another end position. To this end, the locking mechanism includes a lock pawl 31 which is pivotally arranged at a handle portion 32 and operatively cooperates with a spring element 33 constructed as a tension spring. The lock pawl 31 is provided with a step 34 onto which is connected a part 35 provided with a guide track 36. A receiving section or cut-out 37 and a recess 38 are provided on the step 34. The receiving section 37 acts together with a pin 39 of the operating arm 27 shown in dot-dash lines. The operating arm 27 is guided in the housing 26 by means of bearing members 40, 41 and includes an adjusting device 42 for the rope or cable 29.

For displaying the headlight 9, the operating arm 27 is moved in the driving direction into position A shown in FIG. 1. Accordingly, the pin 39 slides along one side of the step 34 while swinging the lock pawl 31, and pin 39 moves into the receiving section 37. Simultaneously, the headlight 9 is pivoted into the in-use position by means of rope or cable 29, and the spring element 20' of the crank gear 15 is tensioned. To conceal the headlight 9, the operating arm 27 is moved into position B shown in FIG. 1, whereby the lock pawl 21 is swung or pivoted by the spring element 33, and the pin 39 of the operating arm 27 rests against one side of part 35 of the lock pawl 31. After loosening the operating arm 27, it is now operated by spring 20' of the crank gear 15 via the rope 29 opposite to the driving direction, whereby the pin 39 moves through the recess 38 of the lock pawl 31 and is disengaged from the locking mechanism 30. The purpose of the guide track 36 is to assure that pin 39 always engages the receiving section 37 during display of the headlight 9, so that an early and undesirable loosening of the operating arm 27 is extensively avoided.

While I have shown and described an embodiment in accordance with the present invention, it is to be clearly understood that the same is susceptible of numerous changes and modifications as will be apparent to one skilled in the art. I, therefore, do not wish to be limited to the details shown and described herein, but intend to cover all such changes and modifications as are encompassed by the scope of the present invention.

I claim:

1. Headlight control arrangement for vehicles, especially motor vehicles, wherein the headlight is pivotally arranged at the vehicle body, comprising operating means for pivoting the headlight between an in-use position and a concealed rest position, characterized in that the operating means includes an operating arm connected to said headlight which is operable through linear movement in one direction to pivot said headlight to said in-use position, spring means for biasing said operating arm in a direction opposite said one direction and locking means for holding the operating arm in a first end position against the bias of said spring means, said locking means including a lock pawl having a receiving section, and a pin on the operating arm operatively cooperating with the receiving section.

2. Headlight according to claim 1, wherein the operating means is operable from the passenger compartment, and the linear movement of the operating arm in said one direction is in the driving direction.

3. Headlight according to claim 1, wherein the locking means disengages automatically during adjustment of the operating arm.

4. Headlight according to claim 1, wherein the lock pawl is pivotally supported at the locking means and operatively cooperates with second spring means.

5. Headlight according to claim 4, wherein the lock pawl has a recess providing for disengagement of the pin of the operating arm.

6. Headlight according to claim 1, wherein the operating arm is a foot lever.

7. Headlight according to claim 6, wherein cable means cooperates with the operating arm for operating the headlight.

8. Headlight according to claim 5, wherein the headlight is arranged on a rotatable shaft mounted at the vehicle body and said operating means includes crank gear means comprising a crank, a disk and a connecting rod for operating the headlight via a lever operatively connected with the rotatable shaft, the first-mentioned spring means being arranged at the crank, and cable means cooperating with the operating arm and surrounding the disk.

* * * * *